United States Patent
Moon et al.

(10) Patent No.: US 11,022,427 B2
(45) Date of Patent: Jun. 1, 2021

(54) DEVICE AND METHOD FOR MEASURING THICKNESS

(71) Applicants: SK hynix Inc., Icheon (KR); INDUSTRY-UNIVERSITY COOPERATION FOUNDATION HANYANG UNIVERSITY, Seoul (KR)

(72) Inventors: Seung Jae Moon, Seoul (KR); Jung Ho Yun, Suwon (KR); Jong Jin Hwang, Seoul (KR); Cheong Il Ryu, Hwaseong (KR); Sung Mook Jung, Yongin (KR); Mun Hyeong Jegal, Yongin (KR)

(73) Assignees: SK hynix Inc., Icheon (KR); INDUSTRY-UNIVERSITY COOPERATION FOUNDATION HANYANG UNIVERSITY, Seoul (KR)

( * ) Notice: Subject to any disclaimer, the term of this patent is extended or adjusted under 35 U.S.C. 154(b) by 0 days.

(21) Appl. No.: 16/813,607

(22) Filed: Mar. 9, 2020

(65) Prior Publication Data

US 2021/0033387 A1    Feb. 4, 2021

(30) Foreign Application Priority Data

Jul. 31, 2019   (KR) .................. 10-2019-0093061

(51) Int. Cl.
G01B 11/06   (2006.01)
(52) U.S. Cl.
CPC ...... *G01B 11/0625* (2013.01); *G01B 11/0633* (2013.01); *G01B 11/0683* (2013.01); *G01B 2210/56* (2013.01)

(58) Field of Classification Search
CPC ............. G01B 2210/56; G01B 11/06; G01B 11/0616; G01B 11/0625; G01B 11/0633;
(Continued)

(56) References Cited

U.S. PATENT DOCUMENTS 3,325,649 A * 6/1967 Bird ................. G01N 21/86
250/559.01
3,892,490 A * 7/1975 Uetsuki ............. G01N 21/8422
356/388

(Continued)

FOREIGN PATENT DOCUMENTS

KR    20090084245        8/2009
KR    20130099369 A      9/2013
(Continued)

*Primary Examiner* — Gordon J Stock, Jr.

(57) ABSTRACT

A thickness measuring device includes a laser emitting a laser beam to an object in a semiconductor processing chamber, a quartz glass inside the chamber reflecting part of the laser beam and to transmit a remainder of the laser beam, a first light receiving sensor detecting an intensity of first reflected light reflected from the quartz glass, a second light receiving sensor detecting an intensity of second reflected light transmitted through the quartz glass and reflected from the object, and a controller configured to calculate input intensity of the laser beam based on the intensity of the first reflected light, to calculate reflectivity of the object by comparing the input intensity of the laser beam with the intensity of the second reflected light, and to measure a thickness of the object by comparing the calculated reflectivity with predetermined reflectivity values for a plurality of thicknesses.

18 Claims, 3 Drawing Sheets

(58) Field of Classification Search
CPC .............. G01B 11/0641; G01B 11/065; G01B 11/0658; G01B 11/0666; G01B 11/0675; G01B 11/0683; G01B 11/0691
See application file for complete search history.

(56) References Cited

U.S. PATENT DOCUMENTS

| | | | | | |
|---|---|---|---|---|---|
| 4,349,274 | A | * | 9/1982 | Steele | G01S 17/48 250/559.31 |
| 4,355,903 | A | * | 10/1982 | Sandercock | G01B 11/0625 356/243.4 |
| 4,826,321 | A | * | 5/1989 | Coates | G01B 11/065 356/369 |
| 4,899,055 | A | * | 2/1990 | Adams | G01B 11/0633 250/372 |
| 5,034,617 | A | * | 7/1991 | Isobe | G01B 11/0616 250/559.28 |
| 5,200,021 | A | * | 4/1993 | Kawai | C23C 16/52 117/86 |
| 5,371,596 | A | * | 12/1994 | Hattori | G01B 11/0675 356/497 |
| 5,420,680 | A | * | 5/1995 | Isobe | G01B 11/065 250/225 |
| 5,433,651 | A | * | 7/1995 | Lustig | B24B 37/013 216/88 |
| 5,648,849 | A | * | 7/1997 | Canteloup | B24B 37/013 257/E21.528 |
| 6,400,458 | B1 | * | 6/2002 | Howald | B24B 37/013 257/E21.528 |
| 6,597,463 | B1 | * | 7/2003 | Singh | G01B 11/0625 356/364 |
| 6,762,849 | B1 | * | 7/2004 | Rulkens | G01B 11/0625 356/503 |

FOREIGN PATENT DOCUMENTS

| | | |
|---|---|---|
| KR | 20130099371 A | 9/2013 |
| KR | 20140034694 A | 3/2014 |
| KR | 20170143069 A | 12/2017 |

* cited by examiner

Thickness

Thickness

DEVICE AND METHOD FOR MEASURING THICKNESS

CROSS-REFERENCE TO RELATED APPLICATION

This application claims priority under 35 U.S.C. § 119 to Korean Patent Application No. 10-2019-0093061 filed on Jul. 31, 2019, which is incorporated herein by reference in its entirety.

BACKGROUND

1. Field

Exemplary embodiments relate to semiconductor technology, and more particularly, to a device and a method for measuring the thickness of material deposited on an electrode rod of an energy purity module (EPM) of an ion implanter.

2. Discussion of the Related Art

In a semiconductor process, ion implantation is a process of implanting dopant ions into a wafer at a desired depth by ionizing a dopant in a vacuum chamber and accelerating extracted dopant ions with sufficient energy into the wafer.

An ion implanter used in such an ion implantation process may include an energy purity module (EPM) that extracts dopant ions having a desired potential and filters out dopant ions having an undesired potential.

The energy purity module is located in a beam line and serves as an electrical filter that filters out dopant ions having a potential lower than a desired potential in an ion beam. An energy purity module may be provided with an electrode rod made of graphite that serves as the electrical filter.

However, a dopant may be deposited on the electrode rod as the ion beam passes through the energy purity module and the dopant deposited on the electrode rod may be a pollution source in the vacuum chamber. This may lead to quality degradation of wafer and reduce the durability of the energy purity module.

Therefore, there is a demand for a technology capable of measuring the thickness of dopants deposited on the electrode rod of the energy purity module in order to ensure timely replacement of the electrode rod of the energy purity module.

In the related art, replacement times for replacing energy purity modules are estimated using values that are based on process conditions without measuring the thickness of a thin film deposited on a wafer during the thin film deposition and growth process.

However, when the conditions of the chamber are changed during the thin film deposition and growth process, the changed conditions may not be reflected in the estimated replacement times, which could result in reduced yield from the wafer.

In this regard, there is a demand for a technology capable of measuring the thickness of a thin film in real-time during the thin film deposition and growth process or measuring the thickness of the thin film before a wafer is unloaded out of the chamber.

SUMMARY

Various embodiments are directed to a device and a method capable of measuring the thickness of a dopant deposited on an electrode rod of an energy purity module of an ion implanter by using laser interferometry.

Furthermore, various embodiments are directed to a device and a method capable of measuring the thickness of a thin film in a thin film deposition and growth process by using a laser interferometer.

In an embodiment, there is provided a device for measuring a thickness including: a laser configured to emit a laser beam to an object in a semiconductor processing chamber; a quartz glass installed inside the chamber and configured to reflect a part of the laser beam and to transmit the remainder of the laser beam; a first light receiving sensor installed inside the chamber and configured to detect an intensity of first reflected light reflected from the quartz glass; a second light receiving sensor installed inside the chamber and configured to detect an intensity of second reflected light transmitted through the quartz glass and reflected from the object; and a controller configured to calculate an input intensity of the laser beam based on the intensity of the first reflected light, to calculate reflectivity of the object by comparing the input intensity of the laser beam with the intensity of the second reflected light, and to measure a thickness of the measurement object by comparing the calculated reflectivity with predetermined reflectivity values for a plurality of thicknesses.

In an embodiment, there is provided a method for measuring a thickness including: emitting a laser beam to an object through a quartz glass in a semiconductor processing chamber; detecting, by a first light receiving sensor, an intensity of first reflected light reflected from the quartz glass; detecting, by a second light receiving sensor an intensity of second reflected light reflected from the object by the laser beam transmitting through the quartz glass; calculating an input intensity of the laser beam based on the intensity of the first reflected light; calculating a reflectivity value of the object by comparing the input intensity of the laser beam with the intensity of the second reflected light; and measuring a thickness of the object by comparing the calculated reflectivity value with predetermined reflectivity values for a plurality of thicknesses.

According to embodiments, it is possible to measure the thickness of a dopant deposited on an electrode rod of an energy purity module used in an ion implantation process, so that it is possible to monitor the replacement time of the electrode rod according to the thickness of the dopant.

Furthermore, it is possible to measure in real-time the thickness of a thin film deposited on a wafer in the chamber in a thin film deposition and growth process and reflect the measured thickness in the process, so that it is possible to improve the yield of the wafer.

DETAILED DESCRIPTION

Figure 1:
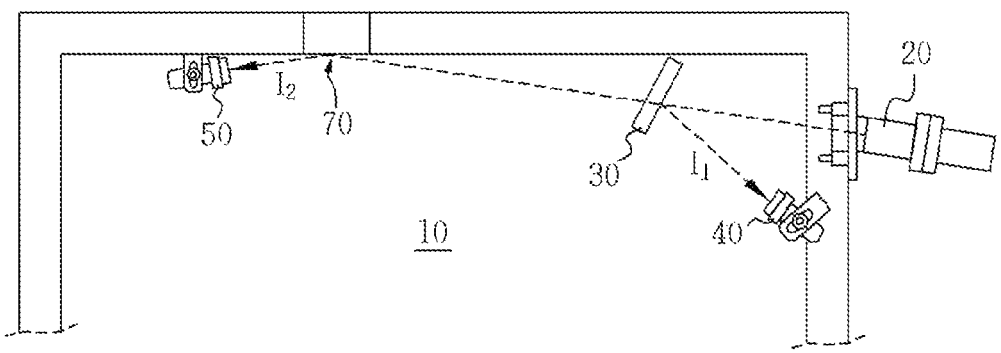
FIG. 1 is a diagram that illustrates a device for measuring a thickness in accordance with an embodiment.

Various embodiments will be described below in more detail with reference to the accompanying drawings such that the present invention can be easily embodied by those skilled in the art to which the present disclosure pertains. Throughout the disclosure, like reference numerals refer to like parts throughout the various figures and embodiments.

Moreover, detailed descriptions related to well-known functions or configurations will be ruled out in order to avoid unnecessarily obscuring this disclosure.

The terms such as first and second may be used to describe various components, but the components are not limited by these terms, which are used only to distinguish one component from another component.

Embodiments provide a device and a method capable of measuring the thickness of a dopant deposited on an electrode rod of an energy purity module (EPM) of an ion implanter using laser interferometry, and the thickness can be used to calculate a replacement time of the electrode rod.

Furthermore, embodiments provide a device and a method capable of measuring in real-time the thickness of a thin film deposited on a wafer in a chamber in a thin film deposition and growth process or measuring the thickness of the thin film before the wafer is unloaded out of the chamber, by using laser interferometry.

FIG. 1 is a diagram that illustrates a device for measuring a thickness in accordance with an embodiment.

Figure 2:
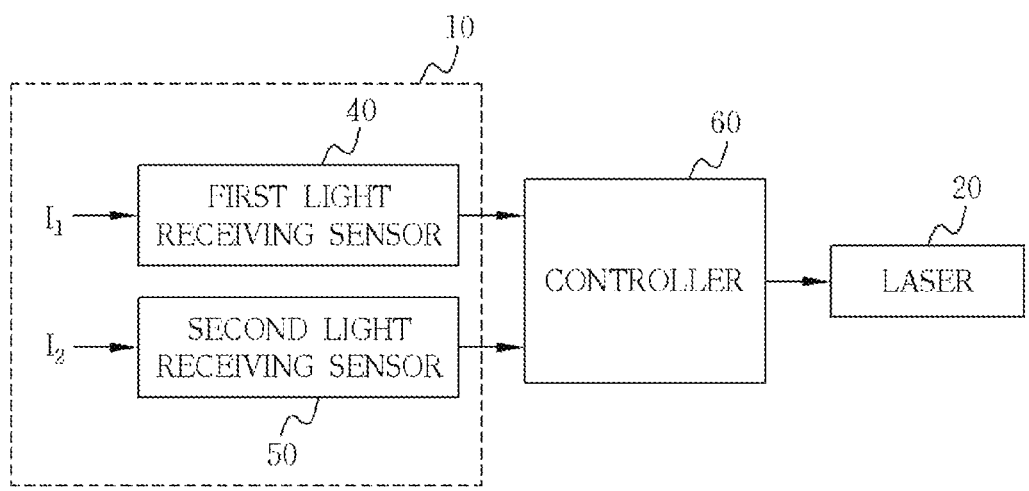
FIG. 2 is a block diagram of the device for measuring a thickness in accordance with an embodiment.

Referring to FIG. 1, the device for measuring a thickness may include a laser 20, a quartz glass 30, a first light receiving sensor 40, a second light receiving sensor 50, and a controller 60 (illustrated in FIG. 2).

The laser 20 is installed outside a semiconductor processing chamber 10 and emits a laser beam to a measurement object 70 in the chamber 10. The laser 20 may emit the laser beam at set incident angles.

The incident angles of the laser beam may be set differently according to a material of the measurement object or a semiconductor process. For example, incident angles of a laser beam that measures deposition thickness from an ion implantation process may be different from the incident angles used to measure the thickness from a thin film deposition and growth process.

Furthermore, the incident angles of the laser beam may be set differently according to a material of a dopant used in the ion implantation process and a material of a thin film deposited on a wafer in the thin film deposition and growth process. For example, the incident angles of the laser beam may be set differently for phosphorus and boron dopants in an ion implantation process. In addition, incident angles of a laser beam may be set differently for an oxide film, a nitride film, and a polysilicon film when a thin film is deposited on the wafer.

In the embodiment of FIG. 1, one laser 20 is installed outside the chamber 10; however, a plurality of lasers may be installed outside the chamber 10. Each of the lasers may be set to emit laser beams to the measurement object 70 at different incident angles.

The quartz glass 30 is installed inside the chamber 10, reflects a part of the laser beam emitted from the laser 20, and allows the remainder of the laser beam to pass therethrough. In an embodiment, the intensity of the beam reflected from the quartz glass 30 may be used to calculate an input intensity of the laser beam. In an embodiment, the part of the laser beam reflected from the quartz glass 30 may be analyzed to adjust sensitivity according to conditions of the chamber and deterioration in the laser.

The first light receiving sensor 40 is installed inside the chamber 10 and may detect the intensity of first reflected light I1, which is the intensity of the beam reflected from the quartz glass 30. The intensity of the first reflected light I1 may be used to calculate the input intensity of the laser beam, and may be used to calculate the reflectivity of the measurement object 70 through the input intensity of the laser beam. In addition, the intensity of the first reflected light I1 may also be used to adjust the sensitivity according to the conditions of the chamber and the deterioration in the laser. Therefore, the quartz may help to control for changing conditions within the chamber, thereby providing highly accurate thickness measurements.

The second light receiving sensor 50 is installed inside the chamber 10 and detects the intensity of second reflected light I2 of the laser beam reflected from the measurement object 70 after transmitting through the quartz glass 30. The intensity of the second reflected light I2 may be used to calculate the reflectivity of the measurement object 70.

The controller 60 may calculate the reflectivity of the measurement object 70 by using the intensity of the first reflected light I1 and the intensity of the second reflected light I2. For example, the controller 60 may calculate the input intensity of the laser beam by using the intensity of the first reflected light I1, and may calculate the reflectivity of the measurement object 70 by dividing the intensity of the second reflected light I2 by the input intensity of the laser beam. That is, the reflectivity of the measurement object 70 may be calculated as a ratio of the intensity of the second reflected light I2 and the input intensity of the laser beam.

Then, the controller 60 may measure the thickness of the measurement object 70 by comparing the calculated reflectivity with a predetermined reflectivity for each thickness. The predetermined reflectivity for each thickness may be classified according to the material of the measurement object 70 and the incident angles of the laser beam.

The measurement object 70 may be a dopant deposited on the electrode rod of the energy purity module used in the ion implantation process. In an ion implantation process, a dopant is ionized in a vacuum chamber and extracted dopant ions are accelerated and are implanted into a wafer at a desired depth. For example, phosphorus, boron and the like may be used as dopants in an ion implantation process.

The energy purity module serves as an electrical filter that extracts dopant ions having a desired potential and filters dopant ions having undesired potential. The energy purity module may use an electrode rod made of graphite that serves as the electrical filter in the vacuum chamber.

Dopants may be deposited on the electrode rod as the ion beam passes through the energy purity module and the dopants deposited on the electrode rod may be a pollution source in the vacuum chamber. This may lead to wafer quality degradation and reduce the durability of the energy purity module. Therefore, it is helpful to measure the thickness of dopants deposited on the electrode rod of the energy purity module, and to use those measurements to determine a replacement time of the electrode rod of the energy purity module.

The controller 60 may calculate the reflectivity of the measurement object 70 by using the intensity of the first reflected light I1 and the intensity of the second reflected light I2, and calculate the thickness of dopants deposited on the electrode rod by using the reflectivity of the measurement object 70. And, the controller 60 may calculate the replacement time of the electrode rod by comparing the thickness of the dopant with a reference parameter. The reference parameter may be a value obtained by calculating in advance the replacement time of the electrode rod in the energy purity module according to the dopant thickness. In an embodiment, the controller may calculate thickness of a dopant layer by measuring an interference pattern between light reflected from a surface of the film and light measured from a surface of the electrode rod at one or more angle. In an embodiment, the intensity of an interference pattern at multiple different angles may correspond to a combination of intensity values that indicates a specific film thickness.

As described above, in an embodiment, the intensity of the first reflected light I1 reflected from the quartz glass 30 and the intensity of the second reflected light I2 reflected from the dopant on the electrode rod, which is the measurement object 70, may be detected, and reflectivity of a dopant layer may be calculated by comparing the intensity of the first reflected light I1 with the intensity of the second reflected light I2.

Furthermore, in an embodiment, the thickness of the dopant is deposited on the electrode rod of the energy purity module may be measured by comparing the calculated reflectivity with a predetermined amount of reflectivity for each possible thickness according to incident angles of a laser beam, and the replacement time of the electrode rod of the energy purity module may be calculated by comparing the thickness of the dopant with the preset parameter.

A device for measuring a thickness in accordance with the present embodiment may further include a condensing lens (not illustrated) provided at the front end of the second light receiving sensor 50 to collect the second reflected light I2. The condensing lens serves to concentrate the intensity of the second reflected light I2 in consideration of scattering of the second reflected light I2 reflected by the measurement object.

The measurement object 70 may be a semi-transparent thin film deposited on the wafer in the vacuum chamber in a thin film deposition and growth process. For example, the semi-transparent thin film deposited in the thin film deposition and growth process may be an oxide film, a nitride film, a polysilicon film and the like.

The controller 60 may control the laser to emit a laser beam to a semi-transparent thin film deposited on the wafer, which is the measurement object, at two or more incident angles. In the embodiment of FIG. 1, one laser is illustrated; however, the device may include a first laser set to a first incident angle and a second laser set to a second incident angle. In various embodiments, three or more lasers may be present.

The controller 60 may calculate reflectivity values for each incident angle, compare the reflectivity values for each incident angle with the predetermined set of reflectivity values for a plurality of thicknesses classified according to the incident angles of the laser beam, and measure in real-time the thickness of the semi-transparent thin film deposited on the wafer during the thin film deposition and growth process. In an embodiment, the reflected light detected by second light receiving sensor 50 may be a product of interference between light reflected off the surface of a film and light reflected off the surface of a material below the film, e.g. a chamber wall, which varies according to in interference pattern between these two reflections. In such an embodiment, thickness may be determined by continuously monitoring the intensity of the reflected interference pattern so the controller can tell where the amount of measured light falls along a reflectivity curve that varies according to thickness. Alternatively, the controller 60 may measure the thickness of the semi-transparent thin film after the film is deposited and before the wafer is unloaded out of the chamber.

In an embodiment, two lasers 20 may be disposed outside the chamber 10 at two angles to maintain a predetermined angle at a position where the wafer is placed, the first light receiving sensor 40 may be disposed inside the chamber 10 to detect the first reflected light I1 reflected from the quartz glass 30, and the second light receiving sensor 50 may be configured to maintain a predetermined angle relative to the wafer inside the chamber 10 to detect the second reflected light I2 reflected from the wafer.

The controller 60 may analyze the intensity of the first reflected light I1 reflected from the quartz glass 30 and adjust sensitivity according to conditions of the chamber 10 and deterioration in the laser 20. Therefore, first reflected light I1 may be used to control for conditions within the chamber that affect the laser beam in real time.

As described above, in an embodiment, reflectivity values for two incident angles of the laser beam may be calculated, the reflectivity values for each incident angle may be compared with predetermined reflectivity values for each thickness classified according to the incident angles of the laser beam, and the thickness of the semi-transparent thin film deposited on the wafer may be measured.

FIG. 2 is a block diagram of the device for measuring a thickness in accordance with an embodiment.

Referring to FIG. 2, the device for measuring thickness includes the laser 20, the first light receiving sensor 40, the second light receiving sensor 50, and the controller 60. The laser 20 and the controller 60 are disposed outside the semiconductor processing chamber 10, and the first light receiving sensor 40 and the second light receiving sensor 50 are disposed inside the chamber 10.

The laser 20 emits a laser beam to the measurement object 70 (illustrated in FIG. 1) in the chamber 10 at a preset incident angle. A part of the laser beam is reflected from the quartz glass 30 (illustrated in FIG. 1) in the chamber 10 and the remainder of the laser beam is emitted to the measurement object 70 after being transmitted through the quartz glass 30.

The first light receiving sensor 40 detects the intensity of the first reflected light I1 of the laser beam reflected from the quartz glass 30, and the second light receiving sensor 50 detects the intensity of the second reflected light I2 of the laser beam reflected from the measurement object 70 after passing through the quartz glass 30.

The controller 60 may control the laser 20 to emit the laser beam at a predetermined incident angle. Furthermore, the controller 60 may control the incident angle of the laser 20. In the present document, the controller 60 controls the incident angle of the laser 20; however, embodiments are not limited thereto. The incident angle of the laser 20 may be set by other components or set manually by an operator.

The controller 60 may determine reflectivity of the measurement object 70 by comparing the intensity of the first reflected light I1 with the intensity of the second reflected light I2, and measure the thickness of the measurement object 70 by comparing the calculated reflectivity with predetermined reflectivity values for each thickness. The predetermined reflectivity values for each thickness may be classified according to the material of the measurement object 70 and one or more incident angles of the laser beam. The reflectivity values for various thicknesses classified according to the material of the measurement object and the incident angles of the laser beam may be determined in advance, stored in a memory of the controller 60, and managed as a database of predetermined values.

Figure 3:
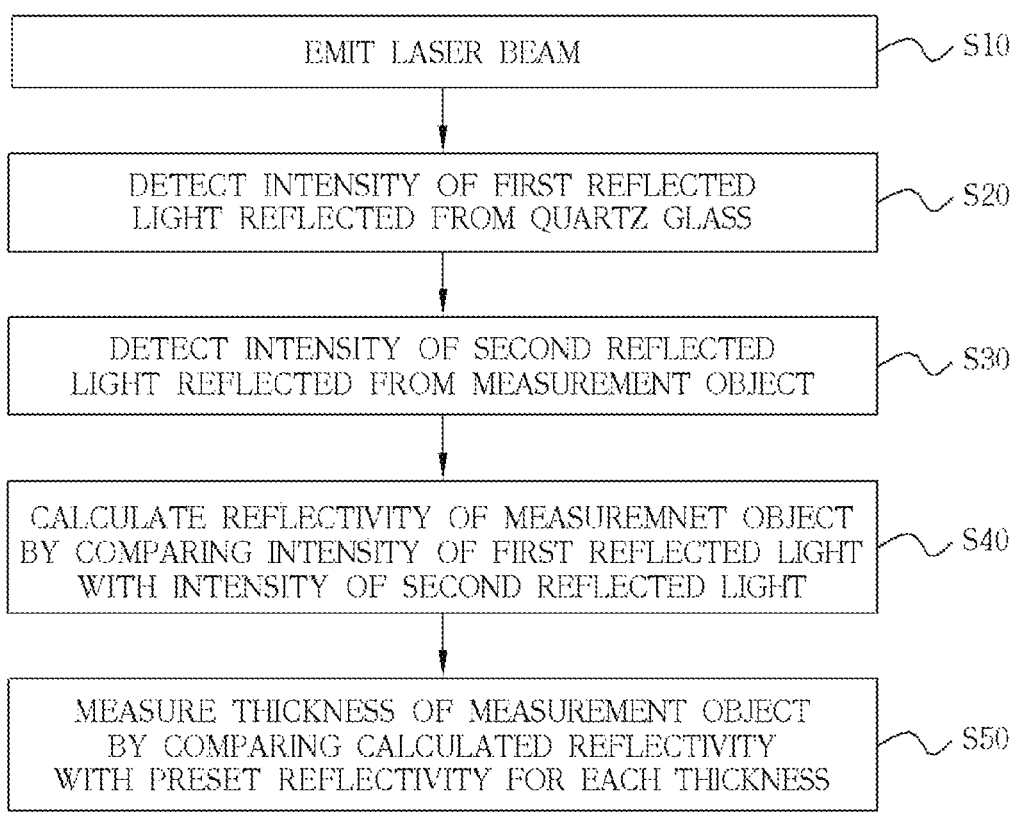
FIG. 3 is a flowchart that illustrates a method for measuring a thickness in accordance with an embodiment.

FIG. 3 is a flowchart for explaining a method for measuring a thickness in accordance with an embodiment.

Referring to FIG. 1 to FIG. 3, the laser 20 emits the laser beam to the measurement object 70 in the semiconductor processing chamber 10 (S10). A part of the laser beam is reflected from the quartz glass 30 and the remainder of the laser beam is emitted to the measurement object 70 after transmitting the quartz glass 30.

The first light receiving sensor 40 detects the intensity of the first reflected light reflected from the quartz glass 30 (S20).

The second light receiving sensor 50 detects the intensity of the second reflected light of the laser beam reflected from the measurement object 70 after transmitting through the quartz glass 30 (S30).

The controller 60 receives measurements of the first reflected light and the second reflected light from the first and second light receiving sensors 40 and 50, and calculates the reflectivity of the measurement object 70 by comparing the intensity of the first reflected light with the intensity of the second reflected light (S40). Then, the controller 60 measures the thickness of the measurement object 70 by comparing the calculated reflectivity with the preset reflectivity for each thickness (S50).

A method for measuring thickness of a coating layer may further comprise establishing predetermined measurement values for various materials and thicknesses. In some embodiments, light measurements for various layer thicknesses may be validated by independent film thickness measurements, e.g. thickness data from a scanning electron microscope. Measurement values may vary predictably based on physical constants, e.g. the wavelength of light, the thickness of a layer, the angle of refraction, etc., so in some embodiments the predetermined values may be determined at least in part by calculating expected values based on physical constants.

Furthermore, in the case of measuring the thickness of dopants deposited on the electrode rod of the energy purity module, the controller 60 may calculate a replacement time for the electrode rod by comparing the thickness of the dopant deposited on the electrode rod with a reference parameter.

Figure 4:
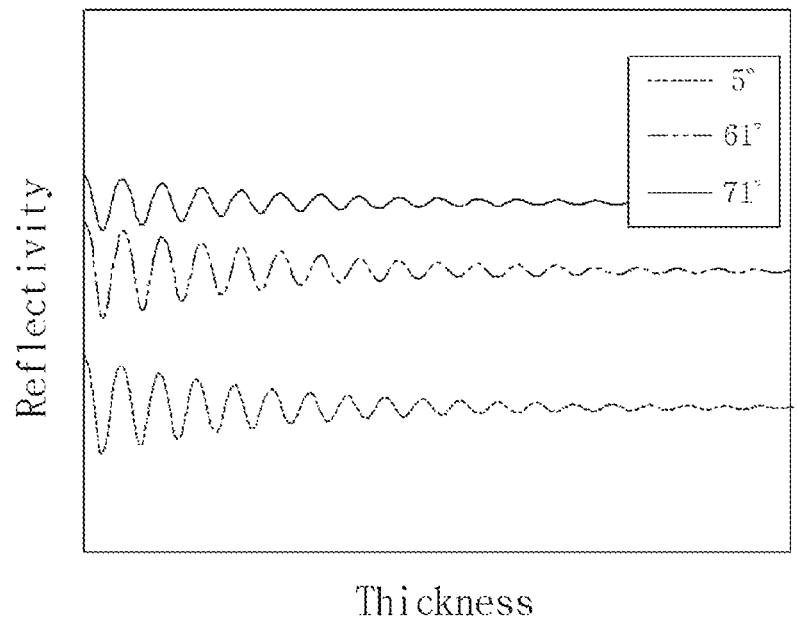
FIG. 4 is a graph illustrating a correlation between reflected light and a dopant thickness according to incident angles of a laser beam in accordance with an embodiment.

FIG. 4 is a graph illustrating a correlation between reflectivity values and dopant thicknesses according to incident angles of a laser beam in accordance with an embodiment.

Referring to FIG. 4, when the measurement object 70 is dopants deposited on the electrode rod of the energy purity module used in the ion implantation process, the reflectivity for each thickness may be measured at incident angles of 5°, 61°, and 71°. As described above, the reflectivity values for each thickness may be measured in advance, and used as a reference value when the thickness of dopants is measured. 5°, 61°, and 71° are merely examples of possible incident angles, and embodiments are not limited thereto.

In an embodiment, the reflectivity for each thickness may be classified according to specific dopant materials. FIG. 4 illustrates an embodiment where the dopant used in the ion implantation is phosphorus. However, other embodiments may measure reflectance values for one or more dopant material at one or more incident angle.

When light is reflected off object 70, the light may reflect off two different surfaces. For example, first light may reflect off the outermost surface of the deposited film, and second light may reflect off the surface of the chamber 10 on which the film is disposed. Because those surfaces are separated by the thickness of the film, the first light will arrive at the second light sensor 50 having a first phase, and the second light will arrive at the second light sensor 50 having a second phase. When the first and second light are combined at the sensor or in a collecting lens, the resultant light may vary in intensity based on the phase difference between the two reflections through constructive and destructive interference.

Dopants such as phosphorous and boron are opaque materials at sufficient thickness. Light will pass through very thin films of those materials, but light is blocked by thicker films. Accordingly, oscillations in reflected light caused by interference between reflections off the film and reflections off chamber walls will decay according to film thickness as shown in FIG. 4. In some embodiments, when measurements are made on a regular or continuous basis, measured reflectivity values can be correlated to predetermined reflectivity values which vary according to thickness to determine a thickness of a deposited film at a given point in time. In some embodiments, measurements at various incident angles are evaluated for the same film.

Figure 5:
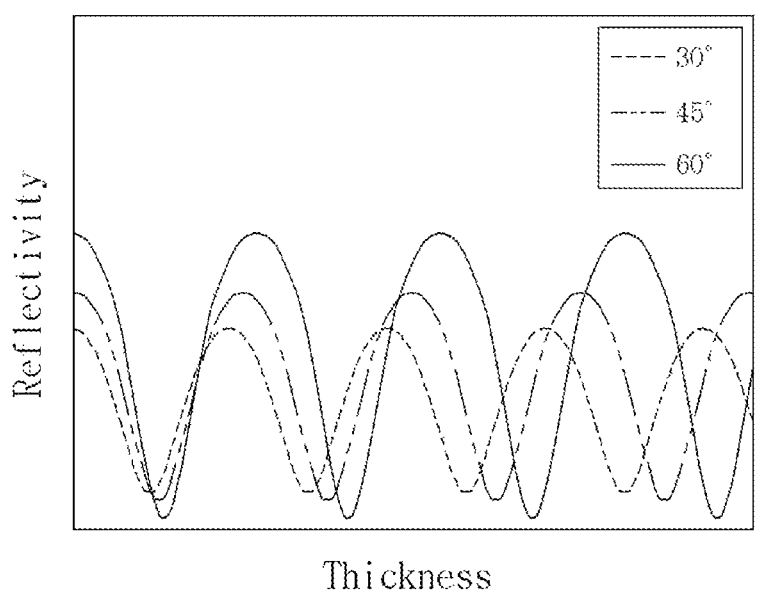
FIG. 5 is a graph illustrating a correlation between reflected light and a thin film thickness according to incident angles of a laser beam in accordance with an embodiment.

FIG. 5 is a graph illustrating a correlation between reflectivity thickness of a thin film according to incident angles of a laser beam in accordance with an embodiment.

Referring to FIG. 5, when the measurement object 70 is a semi-transparent thin film deposited on the wafer in the vacuum chamber in a thin film deposition and growth process, the reflectivity for each thickness may be classified and set according to incident angles 30°, 45°, and 60° of the laser beam. As described above, reflectivity values for various thicknesses may be classified according to the incident angles of the laser beam, measured in advance, and used as a reference value when the thickness of the thin film deposited on the wafer is measured. In the embodiment of FIG. 5, 30°, 45°, and 60° are used as the incident angles of the laser beam, but embodiments are not limited to these three specific values.

In an embodiment, the reflectivity for each thickness may be classified according to various thin film materials. FIG. 5 illustrates an embodiment where the thin film deposited on the wafer is an oxide film. In an embodiment, the reflectivity for various thicknesses for a number of film materials such as oxide films, nitride films, and polysilicon films may be measured and set in advance according to incident angles such as 30°, 45°, and 60° of the laser beam.

FIG. 5 shows that interference patterns of the different incident light angles vary according to distance at different rates. Accordingly, an embodiment may determine the thickness of a thin film by measuring reflectivity values at different incident angles at a given thickness, because the combination of reflectivity values may be unique for a given thickness.

According to the aforementioned embodiments, it is possible to measure the thickness of dopants deposited on the electrode rod of an energy purity module used in an ion implantation process, so that it is possible to monitor the replacement time of the electrode rod according to the thickness of the dopant.

Furthermore, it is possible to measure in real-time the thickness of a thin film deposited on the wafer in the chamber in the thin film deposition and growth process and use the measured thickness to control the deposition process, so that it is possible to improve the yield of a wafer.

Although various embodiments have been described for illustrative purposes, it will be apparent to those skilled in the art that various changes and modifications may be made without departing from the scope of the following claims.

What is claimed is:

1. A device for measuring a thickness, the device comprising:
a laser configured to emit a laser beam to an object in a semiconductor processing chamber;

a quartz glass installed inside the chamber and configured to reflect a part of the laser beam and to transmit a remainder of the laser beam;

a first light receiving sensor installed inside the chamber and configured to detect an intensity of first reflected light reflected from the quartz glass;

a second light receiving sensor installed inside the chamber and configured to detect an intensity of second reflected light transmitted through the quartz glass and reflected from the object; and a controller configured to calculate an input intensity of the laser beam based on the intensity of the first reflected light, to calculate reflectivity of the object by comparing the input intensity of the laser beam with the intensity of the second reflected light, and to measure a thickness of the object by comparing the calculated reflectivity with predetermined reflectivity values for a plurality of thicknesses.

2. The device of claim 1, wherein the object is a dopant layer deposited on an electrode rod of an energy purity module (EPM).

3. The device of claim 2, wherein the controller is configured to calculate a replacement time of the electrode rod by comparing the thickness of the dopant layer deposited on the electrode rod with a predetermined reference parameter.

4. The device of claim 1, further comprising:
a condensing lens configured to concentrate the second reflected light at a front end of the second light receiving sensor.

5. The device of claim 1, wherein the predetermined reflectivity values for each thickness are classified according to a material of the object.

6. The device of claim 5, wherein the predetermined reflectivity values for each thickness are classified according to an incident angle of the laser beam.

7. The device of claim 1, wherein the controller measures a thickness of a semi-transparent thin film deposited on a wafer as the object.

8. The device of claim 1, wherein the controller is configured to control the laser to emit the laser beam to the object at two or more incident angles.

9. The device of claim 8, wherein the controller compares reflectivity values for each of the incident angles with predetermined reflectivity values for a plurality of thicknesses classified according to the two or more incident angles, and measures the thickness of the object.

10. A method for measuring a thickness, the method comprising:
emitting a laser beam to an object through a quartz glass in a semiconductor processing chamber;

detecting, by a first light receiving sensor, an intensity of first reflected light reflected from the quartz glass;

detecting, by a second light receiving sensor, an intensity of second reflected light reflected from the object by the laser beam transmitting through the quartz glass;

calculating an input intensity of the laser beam based on the intensity of the first reflected light;

calculating a reflectivity value of the object by comparing the input intensity of the laser beam with the intensity of the second reflected light; and measuring a thickness of the object by comparing the calculated reflectivity value with predetermined reflectivity values for a plurality of thicknesses.

11. The method of claim 10, wherein the object is a dopant layer on an electrode rod of an energy purity module, and a controller measures a thickness of the dopant layer.

12. The method of claim 11, further comprising:
calculating, by the controller, a replacement time of the electrode rod by comparing the thickness of the dopant layer with a predetermined reference parameter.

13. The method of claim 10, wherein the predetermined reflectivity values are classified according to a material of the object.

14. The method of claim 13, wherein the predetermined reflectivity values are classified according to an incident angle of the laser beam.

15. The method of claim 10, wherein the object is a semi-transparent thin film deposited on a wafer.

16. The method of claim 15, wherein a controller controls the laser to emit the laser beam to the semi-transparent thin film at two or more incident angles.

17. The method of claim 16, wherein the controller calculates reflectivity values for each of the incident angles, compares the reflectivity values for each of the incident angles with the predetermined reflectivity values, and measures the thickness of the object.

18. The method of claim 17, wherein the predetermined reflectivity values are classified according to a material of the semi-transparent thin film and are classified according to the incident angle of the laser beam.

* * * * *